(12) United States Patent
Carter et al.

(10) Patent No.: US 11,884,197 B2
(45) Date of Patent: Jan. 30, 2024

(54) SYSTEMS AND METHODS OF AUTOMATED DEPLOYMENT OF MOUNTING DEVICES FOR PHOTOVOLTAIC MODULES FOR SOLAR PLANT INSTALLATION

(71) Applicant: Nicholas Paul Carter, San Carlos, CA (US)

(72) Inventors: Nicholas Paul Carter, San Carlos, CA (US); Mario Bogdan, Belmont, CA (US); Craig Brinton, Belmont, CA (US)

(73) Assignee: Nicholas P. Carter, San Carlos, CA (US)

( * ) Notice: Subject to any disclaimer, the term of this patent is extended or adjusted under 35 U.S.C. 154(b) by 0 days.

(21) Appl. No.: 17/866,769

(22) Filed: Jul. 18, 2022

(65) Prior Publication Data

US 2023/0014908 A1    Jan. 19, 2023

Related U.S. Application Data

(60) Provisional application No. 63/223,082, filed on Jul. 19, 2021.

(51) Int. Cl.
*B65G 59/06* (2006.01)
*B60P 1/42* (2006.01)
(Continued)

(52) U.S. Cl.
CPC ..................... *B60P 1/42* (2013.01); *B60P 3/00* (2013.01); *B65G 59/063* (2013.01); *B66F 9/063* (2013.01);
(Continued)

(58) Field of Classification Search
CPC .. B65G 59/063; B60P 1/42; B60P 3/00; B66F 9/063; B66F 9/0755; G05D 1/021; H02S 20/10; H02S 20/23
(Continued)

(56) References Cited

U.S. PATENT DOCUMENTS 1,754,463 A * 4/1930 Erb ...................... B65G 59/106
414/795.6
4,026,519 A   5/1977 Piercy
(Continued)

FOREIGN PATENT DOCUMENTS

DE         3238187 A1    4/1984
DE   20 2020 104 473 U1   10/2020

*Primary Examiner* — Lynn E Schwenning
(74) *Attorney, Agent, or Firm* — Eric L. Lane; Green Patent Law

(57) ABSTRACT

Automated systems and methods for deployment of mounting tubs that support photovoltaic modules are provided in which a feeder assembly includes a screw thread assembly and a pivot arm. The screw thread assembly has at least one rotatable threaded component, and two such components in exemplary embodiments, positioned within the feeder assembly. The rotatable threaded component supports the stack of mounting tubs and rotates to separate the individual mounting tub from the stack of mounting tubs and lower the individual mounting tub onto the pivot arm. The pivot arm is configured to interact with an individual mounting tub and pivots to dispense the individual mounting tub onto a mounting surface. A sensor may be provided to detect the positions of the individual mounting tubs as they are moved, and a control system communicates with the sensor and the feeder assembly. The feeder assembly and a hopper holding the stack of mounting tubs may be mounted on an autonomous cart.

19 Claims, 12 Drawing Sheets

(51) Int. Cl.
*B60P 3/00* (2006.01)
*B66F 9/075* (2006.01)
*B66F 9/06* (2006.01)
*G05D 1/02* (2020.01)
*H02S 20/10* (2014.01)
*H02S 20/23* (2014.01)

(52) U.S. Cl.
CPC .......... *B66F 9/0755* (2013.01); *G05D 1/021* (2013.01); *H02S 20/10* (2014.12); *H02S 20/23* (2014.12)

(58) Field of Classification Search
USPC .................. 414/795.4, 795.6, 797.4, 797.8
See application file for complete search history.

(56) References Cited

U.S. PATENT DOCUMENTS

| | | | |
|---|---|---|---|
| 4,498,822 A | 2/1985 | Diba | |
| 4,967,930 A * | 11/1990 | Koltze | B65G 59/103 221/210 |
| 5,082,268 A * | 1/1992 | Santoro | B65H 5/10 221/241 |
| 5,785,489 A * | 7/1998 | Perego | B65G 59/063 414/795.8 |
| 6,098,379 A * | 8/2000 | Spatafora | B65G 33/06 53/448 |
| 6,105,242 A | 8/2000 | Miyasaka et al. | |
| 6,179,549 B1 | 1/2001 | Hayakawa | |
| 7,311,488 B2 | 12/2007 | Park | |
| 8,151,453 B2 | 4/2012 | Garcia Tercero | |
| 8,225,496 B2 | 7/2012 | Bachrach et al. | |
| 8,635,773 B2 | 1/2014 | Carter | |
| 8,851,560 B1 | 10/2014 | Freeman | |
| 9,446,901 B2 * | 9/2016 | Yamagata | B65G 1/12 |
| 9,519,882 B2 | 12/2016 | Galluzzo | |
| 9,733,646 B1 | 8/2017 | Nusser | |
| 10,549,933 B2 * | 2/2020 | Fickler | G07F 13/10 |
| 10,756,667 B2 | 8/2020 | Iversen | |
| 10,801,755 B1 | 10/2020 | Nemat et al. | |
| 10,894,664 B1 | 1/2021 | Brady | |
| 11,241,799 B2 | 2/2022 | Clemenzi | |
| 11,267,653 B2 | 3/2022 | Helsel | |
| 2009/0077804 A1 | 3/2009 | Bachrach et al. | |
| 2009/0211071 A1 | 8/2009 | Lu et al. | |
| 2009/0287446 A1 | 11/2009 | Wang et al. | |
| 2010/0037932 A1 | 2/2010 | Erez et al. | |
| 2012/0163937 A1 | 6/2012 | Zemaitatis | |
| 2013/0133172 A1* | 5/2013 | Kiener | B60P 3/14 414/539 |
| 2016/0214798 A1 | 7/2016 | McCall et al. | |
| 2019/0291956 A1 | 9/2019 | Pajevic | |
| 2021/0379757 A1 | 12/2021 | Schneider | |
| 2022/0103122 A1 | 3/2022 | Carter | |

* cited by examiner up to hundreds of thousands or millions of 25 tubs supporting photovoltaic modules comprises stacking
SYSTEMS AND METHODS OF AUTOMATED DEPLOYMENT OF MOUNTING DEVICES FOR PHOTOVOLTAIC MODULES FOR SOLAR PLANT INSTALLATION

CROSS-REFERENCE TO RELATED APPLICATION

This application is a non-provisional of and claims priority to U.S. Patent Application Ser. No. 63/223,082, filed Jul. 19, 2021, which is hereby incorporated by reference in its entirety.

FIELD

The present disclosure relates to the field of solar power generation, specifically to the large-scale installation of a mounting system for solar photovoltaic (PV) modules.

BACKGROUND

Photovoltaic (PV) systems consisting of numerous PV modules are being installed in growing numbers. Also growing rapidly is the number of modules used in such installations, up to hundreds of thousands or millions of modules in some cases.

One method for mounting those PV modules uses ballasted "tubs" that are commonly made of plastic and are weighted down by concrete ballast blocks placed inside. The PV modules are then clamped to the top of the mounting tubs. Sites may use as many tubs as PV modules, but the current placement process for the tubs is done manually.

Therefore, there exists a need for new systems and methods to automate the deployment of these numerous mounting tubs instead of the current manual placement process.

SUMMARY

The present disclosure, in its many embodiments, alleviates to a great extent the disadvantages of known mounting tub placement processes by providing automated systems and methods for deployment of mounting tubs supporting photovoltaic modules. Disclosed embodiments comprise a feed mechanism that holds a stack of mounting tubs and may be mounted to an autonomous cart. The feed mechanism deploys individual mounting tubs with specified spacing within each row and with defined inter-row spacing by moving around the site on the autonomous cart. When the feed mechanism is empty, the autonomous cart returns to a staging area to be refilled.

Thus, embodiments of the disclosure automate the deployment of mounting tubs that support PV modules, thus facilitating the module installation process, which is especially significant for larger scale PV power plants. Embodiments may be used in conjunction with systems and methods described and claimed in co-pending U.S. Patent Application No. 63/356,658, filed Jun. 29, 2022, co-pending U.S. patent application Ser. No. 17/316,968, filed May 11, 2021, and U.S. Pat. No. 8,635,773, issued Jan. 28, 2014, each of which is hereby incorporated by reference in its entirety.

Exemplary embodiments of an automated system for deployment of mounting tubs supporting photovoltaic modules comprise a feeder assembly including a screw thread assembly and a pivot arm. The screw thread assembly has at least one rotatable threaded component positioned within the feeder assembly. The rotatable threaded component supports the stack of mounting tubs during deployment. The pivot arm is configured to interact with an individual mounting tub. The rotatable threaded component rotates to separate the lowest individual mounting tub from the stack of mounting tubs and lower the individual mounting tub onto the pivot arm. Then the pivot arm pivots to dispense the individual mounting tub onto a mounting surface.

In exemplary embodiments, the rotatable threaded component comprises two rotatable threaded components, which support the stack of tubs while separating and lowering the individual mounting tub. The pivot arm may comprise two arms joined in a U-shape, and the two arms form a profile configured to engage with indents defined in a rim of each individual mounting tub. Exemplary embodiments further comprise one or more sensors configured to detect the positions of the individual mounting tubs. The stack of mounting tubs may be held by a hopper, which aligns the stack of mounting tubs with the feeder assembly. The feeder assembly and the hopper may be mounted on an autonomous cart. Exemplary embodiments have a control system in communication with the feeder assembly and the sensor or sensors.

An exemplary automated method of deploying mounting tubs supporting photovoltaic modules comprises stacking mounting tubs on a hopper, separating a first mounting tub and lowering the first mounting tub onto a pivot arm, and dispensing the first (lowest) mounting tub onto a mounting surface. In exemplary embodiments, the separating and lowering steps comprise rotating at least one threaded component, and the dispensing step comprises pivoting the pivot arm to lower the first mounting tub onto the mounting surface.

Exemplary methods further comprise pivoting the pivot arm, so it is clear of the first mounting tub. Then a second mounting tub is separated from the stack and lowered onto the pivot arm. Disclosed methods further comprise dispensing the second mounting tub onto the mounting surface. In exemplary embodiments, the first and second mounting tubs are dispensed in a row with specified spacing within the row.

Exemplary embodiments of an automated system for deployment of mounting tubs supporting photovoltaic modules comprise a hopper configured to hold a stack of mounting tubs, and a feeder assembly aligned with the hopper. The feeder assembly includes a screw thread assembly and a pivot arm. The screw thread assembly has at least one rotatable threaded component positioned within the feeder assembly. The rotatable threaded component supports the stack of mounting tubs during deployment. The pivot arm is configured to interact with an individual mounting tub.

The rotatable threaded component rotates to separate the individual mounting tub from the stack of mounting tubs and lower the individual mounting tub onto the pivot arm. Then the pivot arm pivots to dispense the individual mounting tub onto a mounting surface. The feeder assembly and the hopper may be mounted on an autonomous cart. Exemplary embodiments have a control system in communication with the feeder system and the sensor or sensors that detect the position of the mounting tubs.

Accordingly, it is seen that automated systems and methods for deployment of mounting tubs supporting photovoltaic modules are provided. These and other features of the present disclosure will be appreciated from review of the following detailed description, along with the accompanying figures in which like reference numbers refer to like parts throughout. It should be noted that in some figures, a smaller than real-world number of mounting tubs is shown solely to illustrate working principles.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
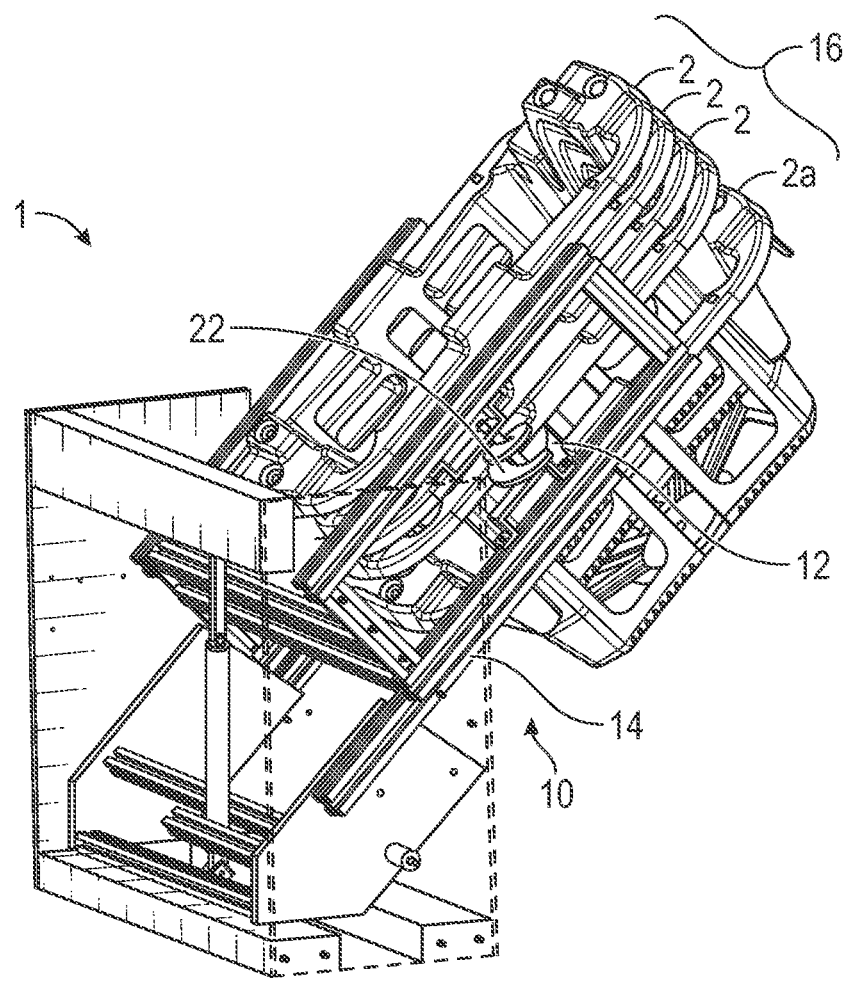
FIG. 1 is a perspective view of an exemplary automated system for deployment of mounting tubs supporting photovoltaic modules in accordance with the present disclosure.
Figure 2:
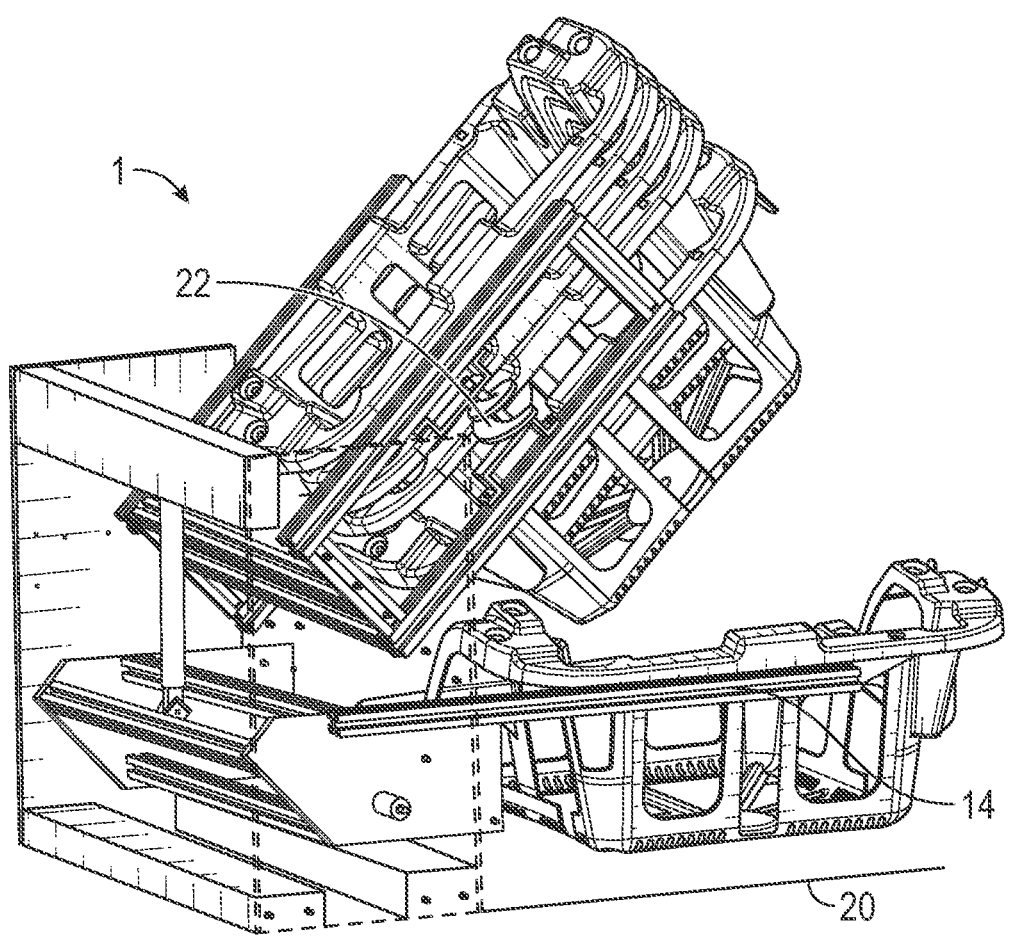
FIG. 2 is a perspective view of an exemplary automated system for deployment of mounting tubs supporting photovoltaic modules in accordance with the present disclosure.
Figure 3:
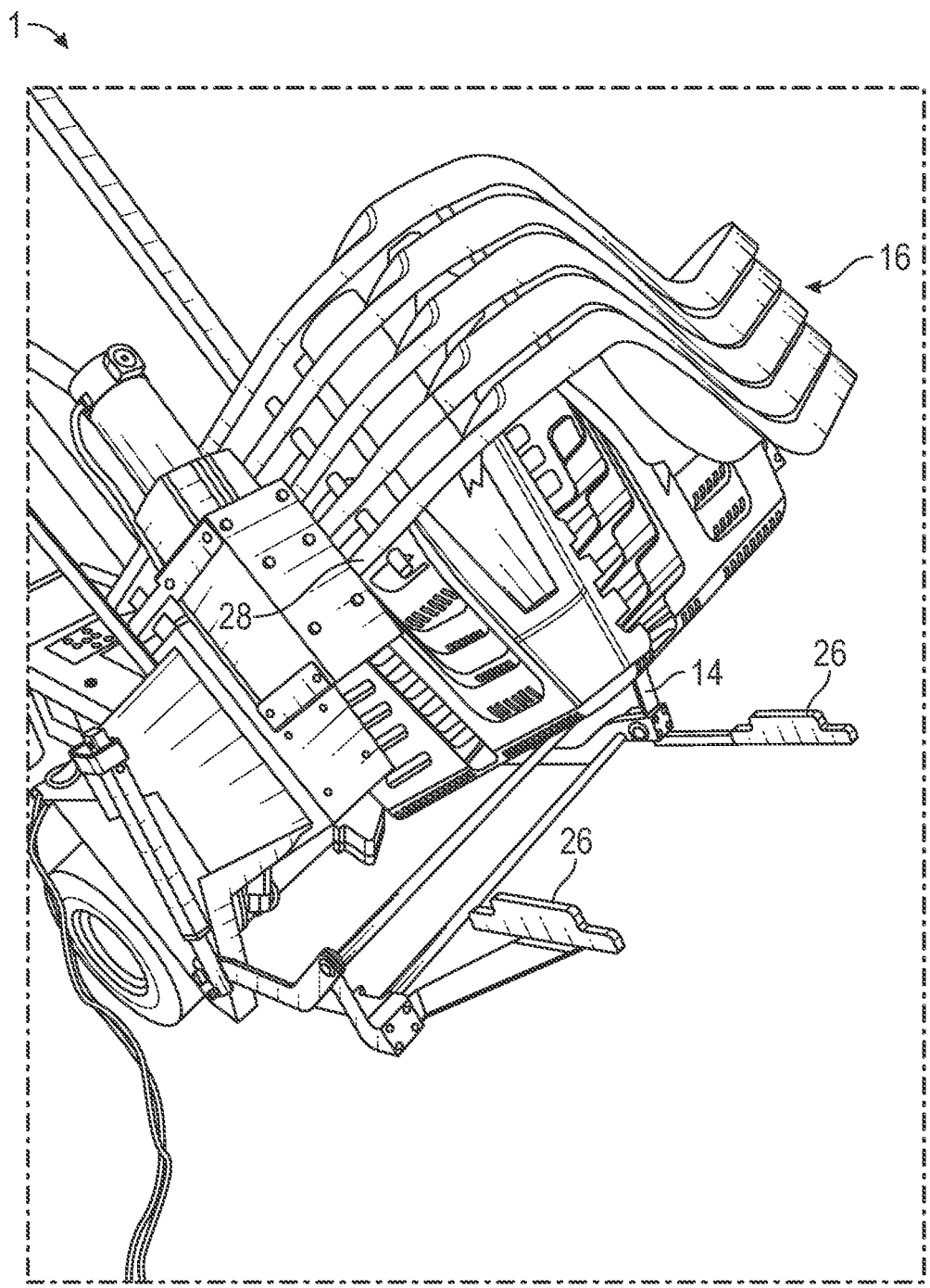
FIG. 3 is a perspective view of an exemplary automated system for deployment of mounting tubs supporting photovoltaic modules in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents.

Furthermore, reference to various aspects of the disclosure throughout this document does not mean that all claimed embodiments or methods must include the referenced aspects. Reference to shape, orientation, and other parameters should be considered as representative and illustrative of the capabilities of exemplary embodiments, and embodiments can operate with a wide variety of such parameters. It should be noted that the figures do not show every piece of equipment.

Referring to FIGS. 1-6, an exemplary automated system 1 for deployment of mounting tubs 2 will be described. The system 1 features an automated feed mechanism or feeder assembly 10 that is comprised of a screw thread assembly 12 and a pivot arm 14. As described in more detail herein, an exemplary screw thread mechanism 12 separates individual mounting tubs 2 from a stack 16 of tubs 2 held within a containing framework mounted on an autonomous cart 18. The pivoting arm mechanism 14 then delivers or dispenses each mounting tub 2 in turn onto a mounting surface 20, such as the ground or a rooftop membrane. The automated feed mechanism 10 mounted on an autonomous cart 18 deploys the mounting tubs 2 at prescribed intervals within rows that, in turn, have specific inter-row spacing.

Figure 5:
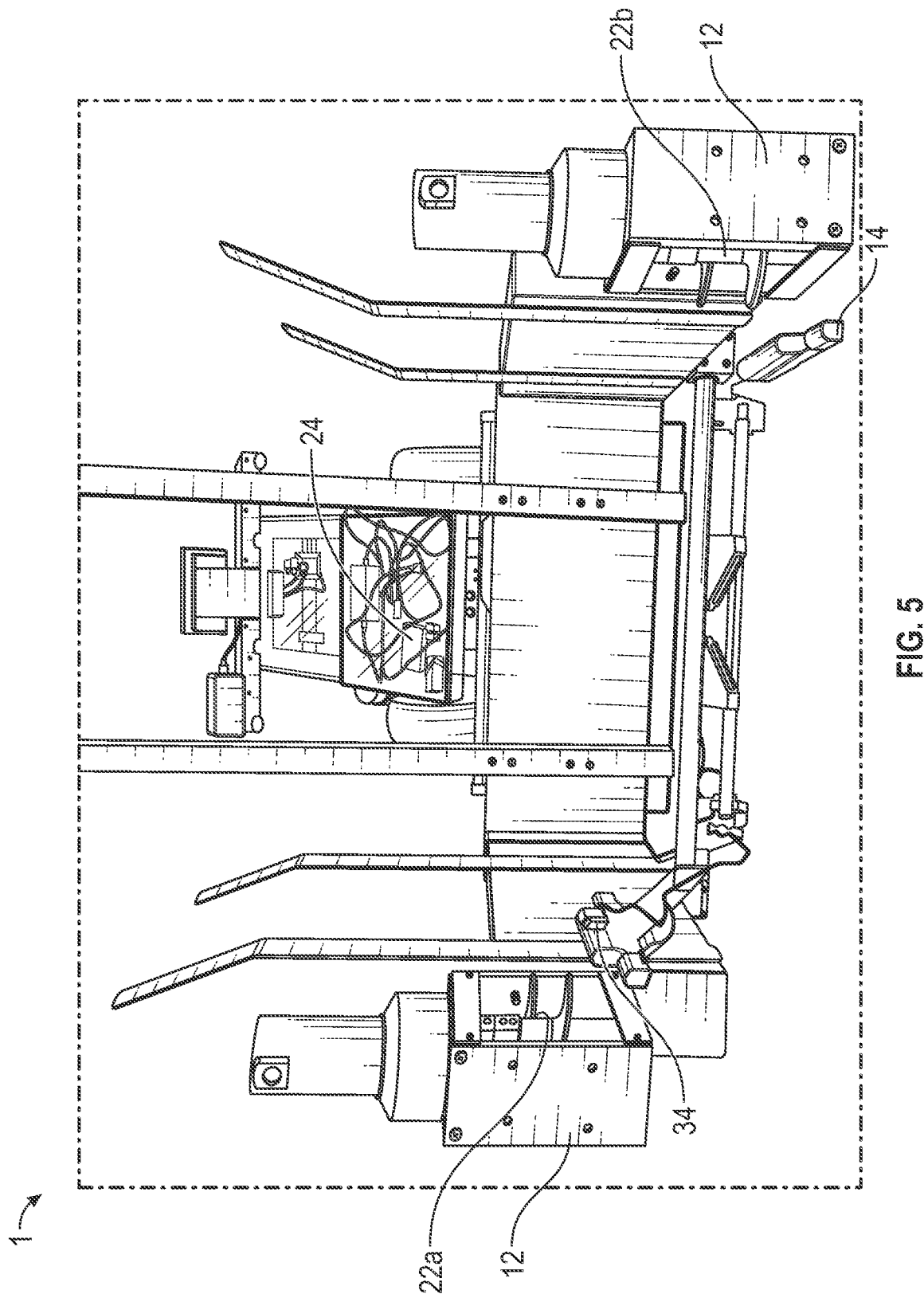
FIG. 5 is a front perspective view of an exemplary automated system for deployment of mounting tubs supporting photovoltaic modules showing an exemplary control system and sensor in accordance with the present disclosure.
Figure 6:
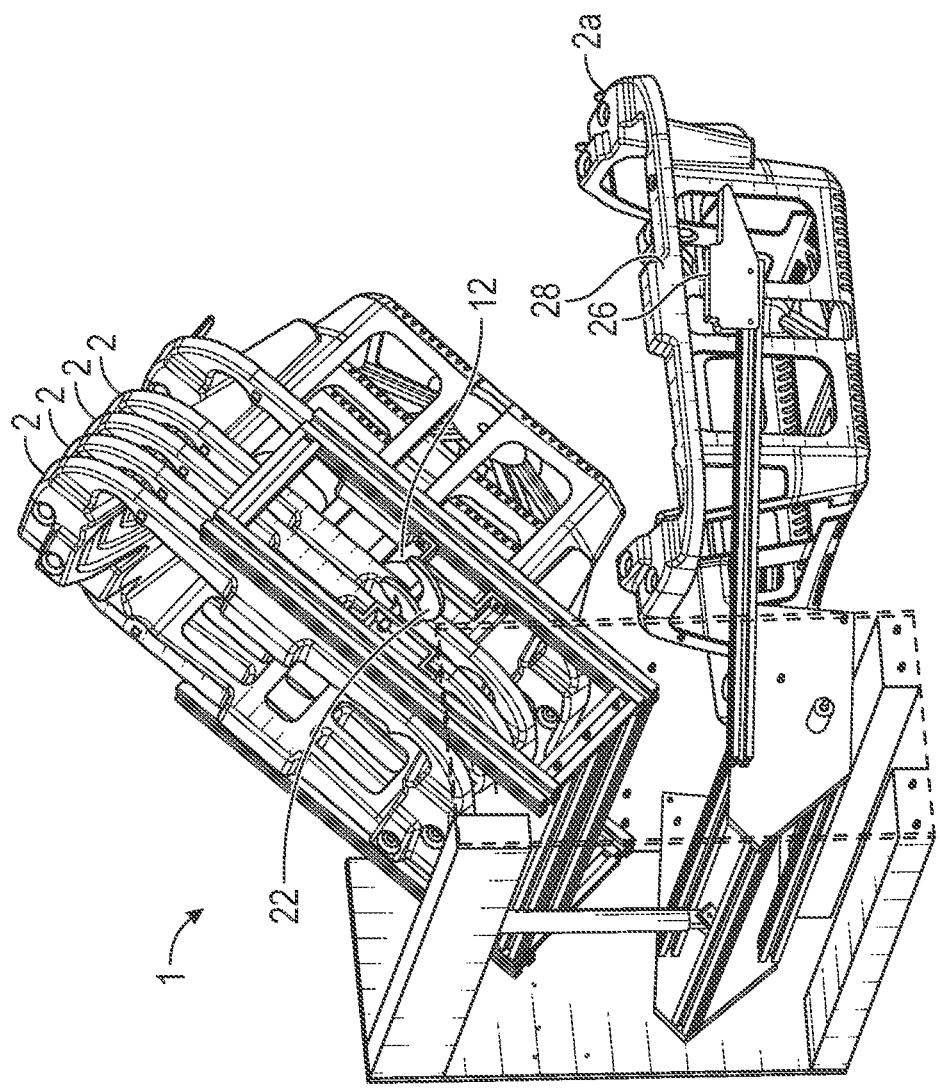
FIG. 6 is a perspective view of an exemplary automated system for deployment of mounting tubs supporting photovoltaic modules in accordance with the present disclosure.

As discussed in more detail herein, one or more sensors 34 or micro-switches (shown in FIG. 5) detect the movement and the presence of the mounting tubs 2 during operation, and the system 1 is operated and driven by a control system 24, best seen in FIG. 5. An exemplary system controller (control system) 24 includes a dedicated microcontroller connected to relays, sensors and switches 34, programmed with custom software in order to control the activation, sequence of operation and run-time duration of the various component parts that comprise the system 1.

An exemplary screw thread assembly 12 comprises at least one rotatable threaded component 22, and may have two such components 22a, 22b positioned within the structure of the feeder assembly 10, one on either side, to support a stack 16 of mounting tubs 2. In exemplary embodiments, the threaded components 22a, 22b rotate in sync driven by control system 24 to lower a single mounting tub 2 onto the pivot arm 14. It should be noted that the threaded components 22a, 22b may have like threads and identical directions of rotation or have reverse threads and be contra-rotating. Advantageously, the threaded components 22a. 22b can lower the mounting tub 2 while still supporting the remainder of the stack 16 of tubs 2.

An exemplary pivot arm 14 is comprised of two arms 26 joined in a U-shape, formed to interact with an individual mounting tub 2 by using a profile that engages with specific indents 28 in the rim of the tub 2. The customized shape of the arms 26 can be seen in FIGS. 3 and 6, where they engage with indents 28 in the rim of the mounting tub 2. Pivot arm 14 pivots or rotates until the tub 2 rests on the mounting surface 20, rotates further to disengage from the tub and then is moved aside once the autonomous cart 18 moves forward, leaving the tub in place. The pivot arm 14 can then pivot or rotate back to its starting position ready for the process to be repeated.

Figure 4:
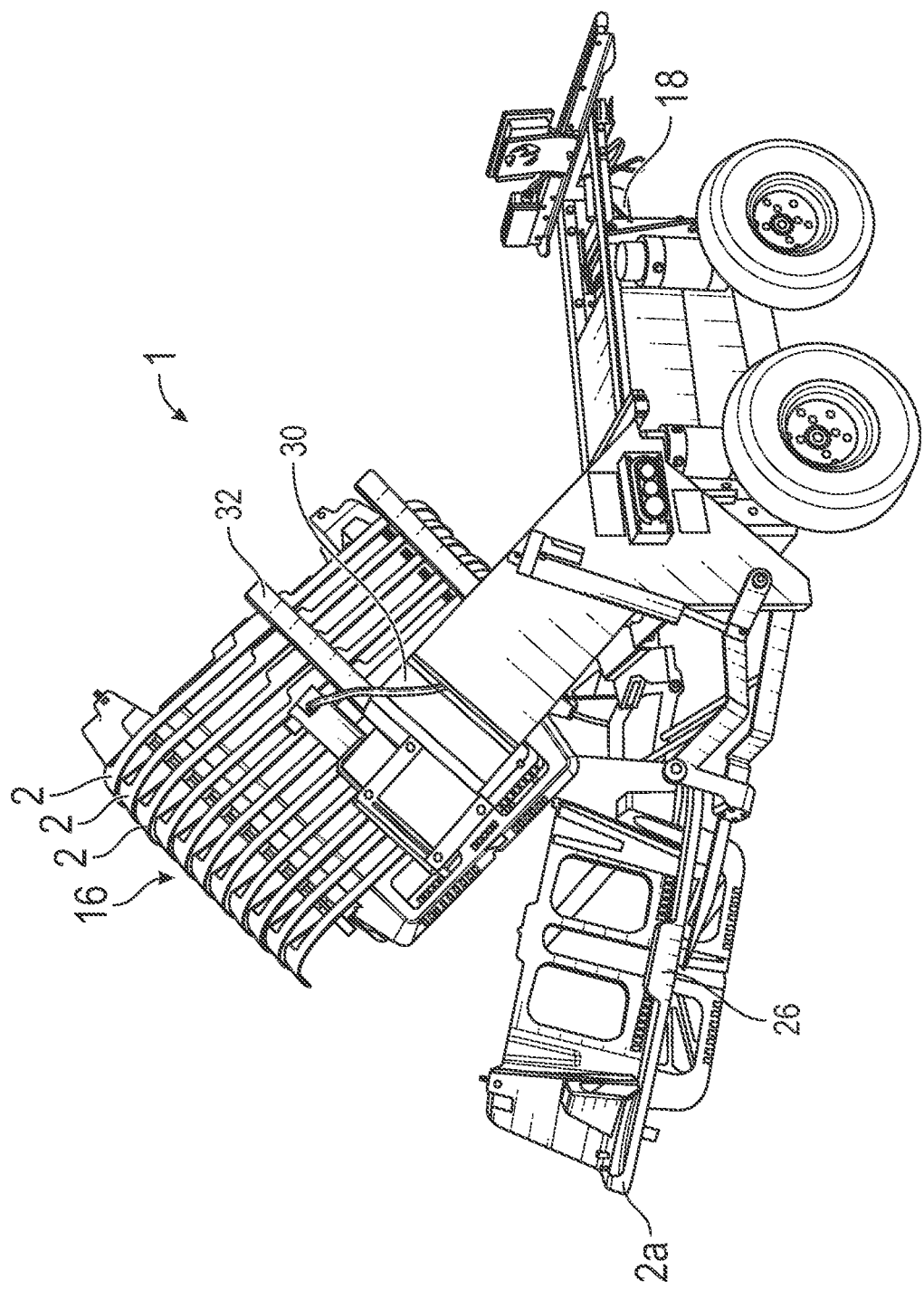
FIG. 4 is a perspective view of an exemplary automated system for deployment of mounting tubs supporting photovoltaic modules shown mounted to an autonomous cart in accordance with the present disclosure.

As shown in FIG. 4, a stack 16 of PV-module mounting tubs 2 sit in a hopper structure 30 consisting of a framework 32 which constrains and supports the tubs in place and aligns them with feeder assembly 10. In exemplary embodiments, hopper 30 is mounted on an autonomous cart 18, which navigates the installation site with minimal human intervention. The hopper 30 may be tilted at an angle to the vertical to move the center of gravity of the stack 16 of mounting tubs 2 closer to the center of gravity of the cart 18.

Figure 7:
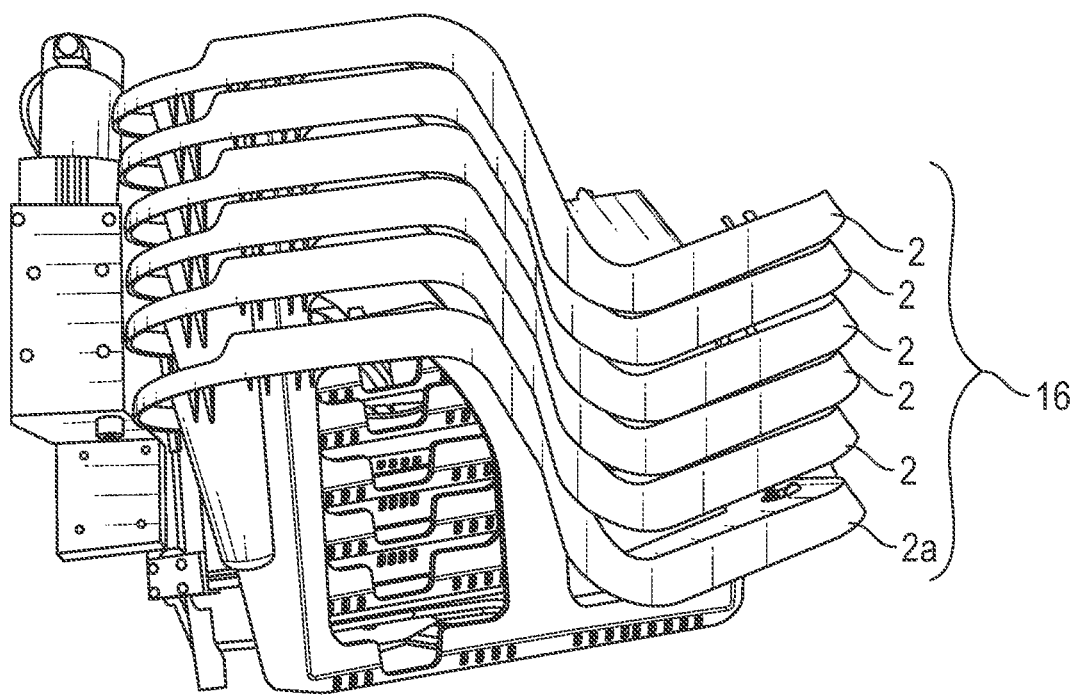
FIG. 7 is a front perspective view of a stack of mounting tubs being separated and dispensed by an exemplary automated system for deployment of mounting tubs supporting photovoltaic modules in accordance with the present disclosure.
Figure 8:
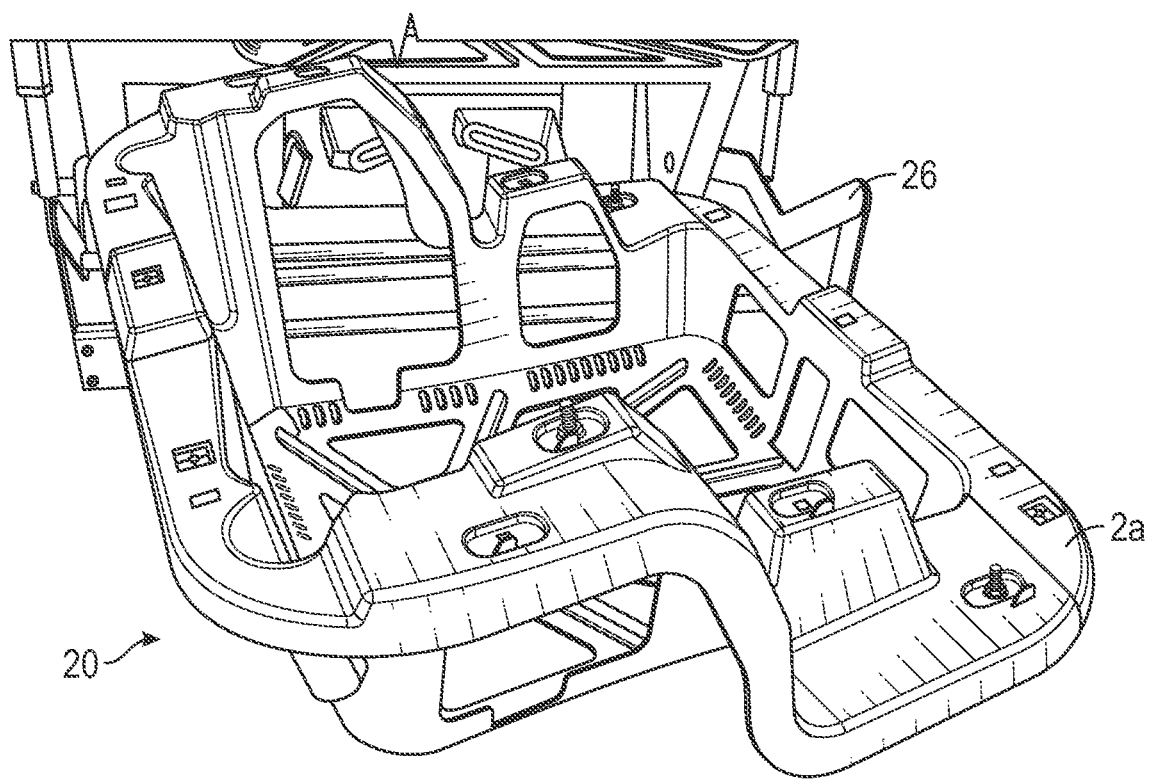
FIG. 8 is a top perspective view of a mounting tub being dispensed in accordance with an exemplary method of deployment of mounting tubs supporting photovoltaic modules in accordance with the present disclosure.
Figure 9:
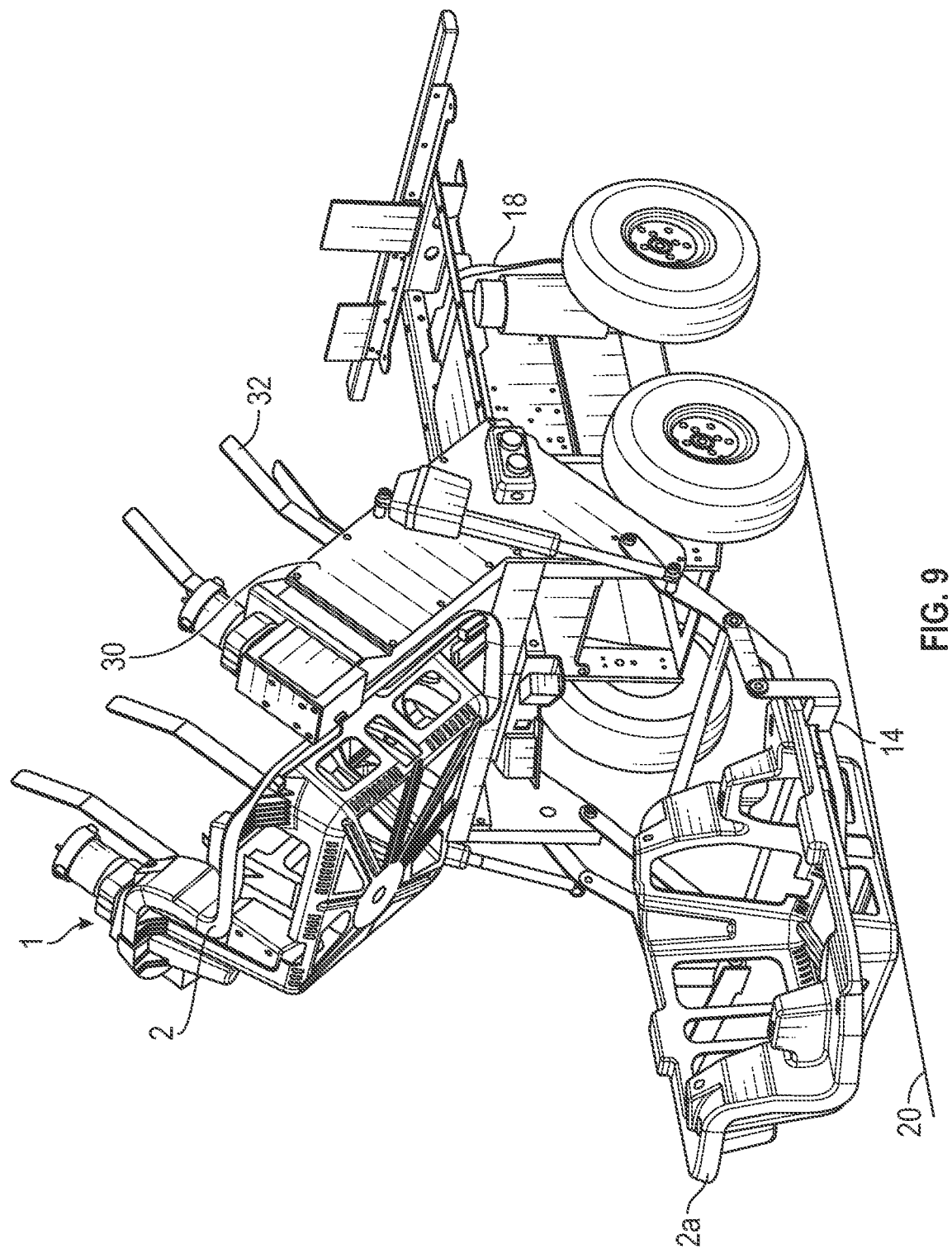
FIG. 9 is a perspective view of an exemplary automated system for deployment of mounting tubs supporting photovoltaic modules shown mounted to an autonomous cart in accordance with the present disclosure.

In operation, the hopper 30 is mounted onto an autonomous cart 18 and loaded with a stack 16 of mounting tubs 2. The cart 18 navigates the solar PV installation site, moving through the site until it reaches the necessary location to unload the mounting tubs 2. Once at the proper location, as best seen in FIG. 4, the screw thread assembly 12 operates to separate the bottom mounting tub 2a from the stack 16 of tubs 2 by rotation. As shown in FIG. 5, there are two threaded components 22a, 22b. As best seen in FIG. 9, the system lowers all the mounting tubs 2 and operates until the bottom tub 2a is released from the stack 16 onto the pivot arm 14. More particularly, as shown in FIG. 7, the threaded components 22a, 22b rotate in sync to lower the bottom mounting tub 2a onto the pivot arm 14 while still supporting the remainder of the stack 16 of tubs 2. Referring to FIGS. 7-12, operation of the threaded components 22a, 22b continues until the presence of the bottom tub 2a is detected on the pivot arm 14 by the sensor or microswitch 34.

Figure 10:
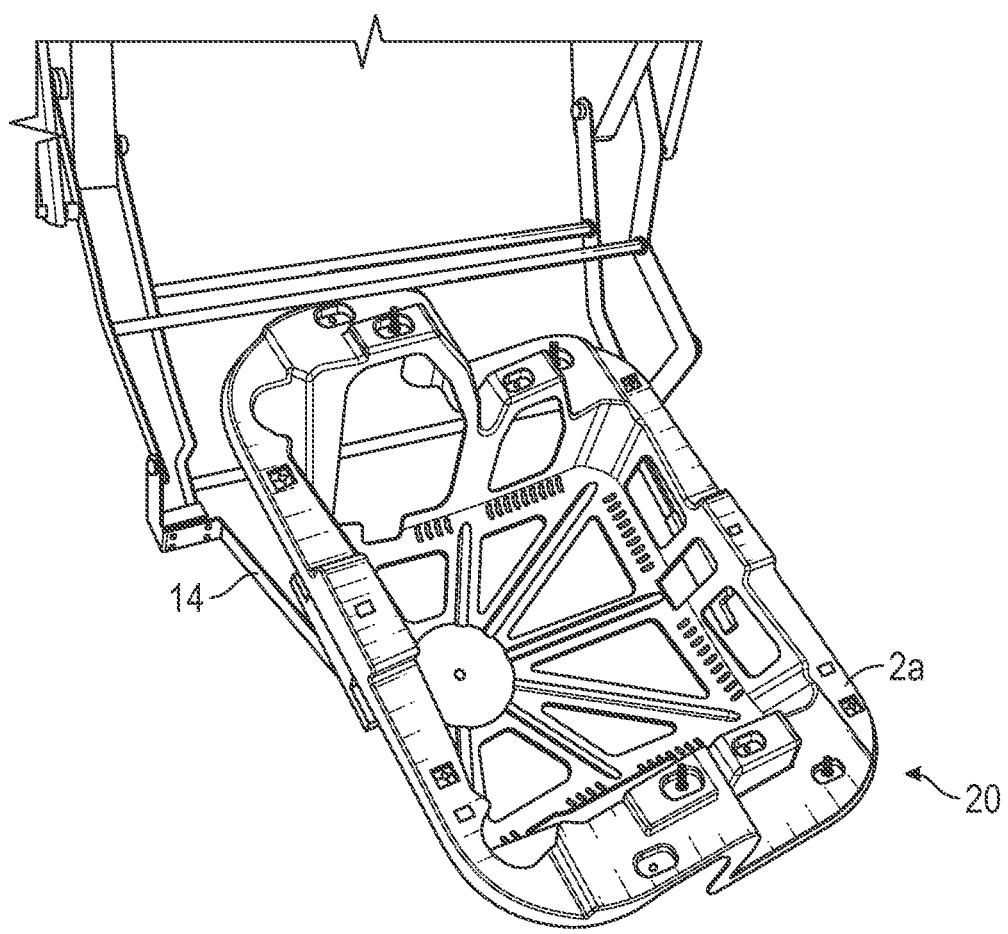
FIG. 10 is a top perspective view of a mounting tub being dispensed in accordance with an exemplary method of deployment of mounting tubs supporting photovoltaic modules in accordance with the present disclosure.

When the single separated tub 2a has reached the position where it is supported by the pivot arm 14, i.e., when the two arms 26 engage with indents 28 in the rim of the mounting tub 2a, sensor or switch 34 detects the presence of the tub on the pivot arm and triggers the control system 24 so the control system 24 starts the pivot arm pivoting or rotating. That is, one or more sensors or micro-switches 34 detect the presence of the tub 2a on the pivot arm 14 to initiate the rotation of the pivot arm 14. As shown in FIGS. 8, 9 and 10, the pivot arm 14 now rotates the bottom mounting tub 2a onto the mounting surface 20. i.e., the ground or a roof membrane. Switch 34 detects when rotation is complete and the tub 2a is no longer supported by pivot arm 14, that is, the sensor detects the disengagement of the tub 2a from the pivot arm 14 once it is on the mounting surface 20.

Once a switch or sensor 34 indicates that this position has been reached, pivot arm 14 has sufficient clearance so that it can further rotate to a point where the autonomous cart 18 to which the feeder assembly 10 is attached can advance forward. As shown in FIG. 10, the pivot arm 14 continues to rotate to disengage from the mounting tub 2, and the autonomous cart 18 moves forward until the pivot arm 14 is free of the dispensed mounting tub. This moves pivot arm 14 clear of the dispensed mounting tub 2 so the pivot arm 14 is no longer supporting the tub, leaving it on the mounting surface 20.

Figure 11:
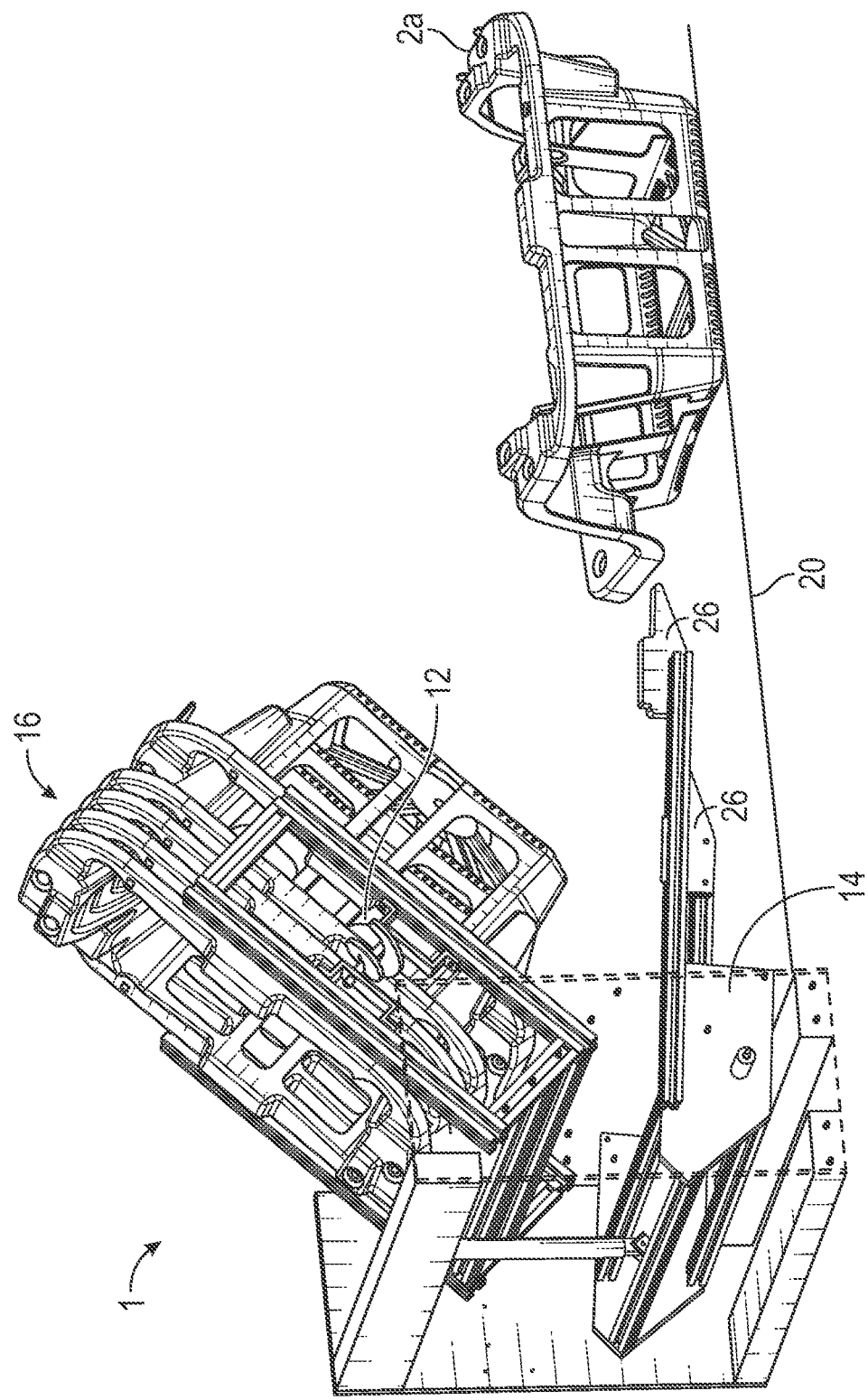
FIG. 11 is a perspective view of an exemplary automated system for deployment of mounting tubs supporting photovoltaic modules in accordance with the present disclosure.

Once the control system 24 registers that pivot arm 14 is clear of the dispensed mounting tub 2, the pivot arm 14 can then rotate back to its starting position ready to receive the next mounting tub 2. More particularly, as best seen in FIG. 11, when the sensor 34 detects that the pivot arm 14 has rotated sufficiently to disengage from the tub and the drive mechanism for the autonomous cart has been engaged to advance the cart 18, the pivot arm 14 can start rotating back up as soon as the control system 24 determines that the rotating pivot arm 14 is clear of the dispensed tub. This prevents the pivot arm 14 from colliding with the dispensed mounting tub 2. It should be noted that the operations and motions of the pivot arms 14 to rotate back up and to avoid colliding with the dispensed tub could be performed sequentially or in parallel with the advancement of the cart 18.

Figure 12:
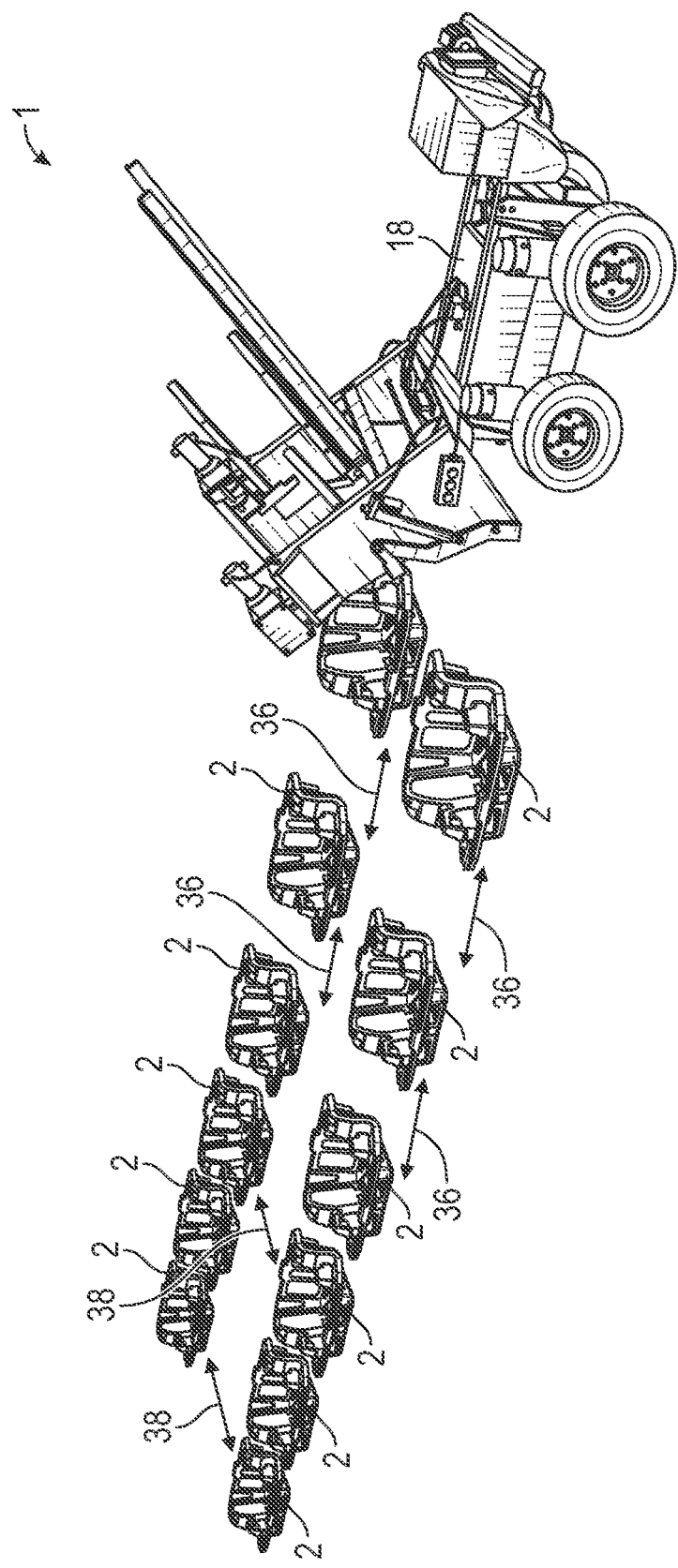
FIG. 12 is a perspective view of two short test rows of mounting tubs, deployed using an exemplary automated system for deployment of mounting tubs supporting photovoltaic modules, spaced ready to receive PV modules.

This sequence can be repeated once the cart 18 is in the correct position to dispense the next mounting tub, again indicated by the drive system 24 of the autonomous cart 18. The full sequence of steps can be repeated until a sensor 34 indicates that the hopper 30 is empty of mounting tubs 2 and the autonomous cart 18 can return to the staging area to be loaded with more tubs. As shown in FIG. 12, the autonomous cart 18 is programmed so the mounting tubs 2 are dispensed with the required spacing 36 between tubs 2 and the inter-row spacing distance 38, so that it can dispense tubs 2 appropriately to construct the solar power plant with minimal human interaction.

Thus, it is seen that automated systems and methods for deployment of mounting tubs supporting photovoltaic modules are provided. It should be understood that any of the foregoing configurations and specialized components may be interchangeably used with any of the systems of the preceding embodiments. Although illustrative embodiments of the present disclosure are described hereinabove, it will be evident to one skilled in the art that various changes and modifications may be made therein without departing from the disclosure. It is intended in the appended claims to cover all such changes and modifications that fall within the true spirit and scope of the disclosure.

What is claimed is:

1. An automated system for deployment of mounting tubs supporting photovoltaic modules, comprising:
    a feeder assembly including a screw thread assembly and a pivot arm having two arms;
    the screw thread assembly having at least one rotatable threaded component positioned within the feeder assembly, the at least one rotatable threaded component supporting the stack of mounting tubs;
    the two arms forming a profile configured to engage with indents defined in a rim of an individual mounting tub;
    wherein the at least one rotatable threaded component rotates to separate the individual mounting tub from the stack of mounting tubs and lower the individual mounting tub onto the pivot arm; and
    wherein the pivot arm pivots to dispense the individual mounting tub onto a mounting surface.

2. The automated system of claim 1 wherein the at least one rotatable threaded component comprises two rotatable threaded components.

3. The automated system of claim 2 wherein the two rotatable threaded components support the stack of mounting tubs while separating and lowering the individual mounting tub.

4. The automated system of claim 1 wherein the two arms are joined in a U-shape.

5. The automated system of claim 1 further comprising one or more sensors configured to detect positions of one or more individual mounting tubs.

6. The automated system of claim 5 further comprising a control system in communication with the feeder assembly and the one or more sensors.

7. The automated system of claim 1 further comprising a hopper configured to hold the stack of mounting tubs and align the stack of mounting tubs with the feeder assembly.

8. The automated system of claim 7 further comprising an autonomous cart, wherein the hopper is mounted on the autonomous cart.

9. The automated system of claim 8 wherein the feeder assembly is mounted on the autonomous cart.

10. An automated method of deploying mounting tubs supporting photovoltaic modules, comprising:
    stacking mounting tubs on a hopper;
    separating a first mounting tub and lowering the first mounting tub onto a pivot arm having two arms such that the two arms engage with indents in a rim of the first mounting tub; and
    dispensing the first mounting tub onto a mounting surface.

11. The method of claim 10 wherein the separating and lowering steps comprise rotating at least one threaded component.

12. The method of claim 10 wherein the dispensing step comprises pivoting the pivot arm to lower the first mounting tub onto the mounting surface.

13. The method of claim 12 further comprising pivoting the pivot arm so it is clear of the first mounting tub.

14. The method of claim 13 further comprising separating a second mounting tub and lower the second mounting tub onto the pivot arm.

15. The method of claim 14 further comprising dispensing the second mounting tub onto the mounting surface.

16. The method of claim 15 further comprising dispensing the first and second mounting tubs in a row with specified spacing within the row.

17. An automated system for deployment of mounting tubs supporting photovoltaic modules, comprising:
a hopper configured to hold a stack of mounting tubs;
a feeder assembly aligned with the hopper, the feeder assembly including a screw thread assembly and a pivot arm having two arms joined in a U-shape;
the screw thread assembly having at least one rotatable threaded component positioned within the feeder assembly, the at least one rotatable threaded component supporting the stack of mounting tubs;
the pivot arm being configured to interact with an individual mounting tub;
wherein the at least one rotatable threaded component rotates to separate the individual mounting tub from the stack of mounting tubs and lower the individual mounting tub onto the pivot arm; and
wherein the pivot arm pivots to dispense the individual mounting tub onto a mounting surface.

18. The automated system of claim 17 further comprising an autonomous cart, wherein the hopper and the feeder assembly are mounted on the autonomous cart.

19. The automated system of claim 17 further comprising one or more sensors configured to detect positions of one or more individual mounting tubs and a control system in communication with the feeder assembly and the one or more sensors.

* * * * *